United States Patent [19]

Yokomizo

[11] Patent Number: 5,923,824
[45] Date of Patent: Jul. 13, 1999

[54] COLOR PROCESSING METHOD

[75] Inventor: Yoshikazu Yokomizo, Yokohama, Japan

[73] Assignee: Canon Kabushiki Kaisha

[21] Appl. No.: 08/904,651

[22] Filed: Aug. 1, 1997

Related U.S. Application Data

[62] Division of application No. 08/097,035, Jul. 27, 1993, Pat. No. 5,699,489.

[30] Foreign Application Priority Data

Jul. 31, 1992 [JP] Japan .................................... 4-205246

[51] Int. Cl.$^6$ ............................... H04N 1/56; H04N 1/60
[52] U.S. Cl. ........................................... 395/109; 358/518
[58] Field of Search ........................... 395/109; 358/518, 358/504, 505, 506, 515, 527, 529, 500, 523; 382/167

[56] References Cited

U.S. PATENT DOCUMENTS

| | | |
|---|---|---|
| 4,739,397 | 4/1988 | Hayashi . |
| 4,897,799 | 1/1990 | Le Gall et al. . |
| 5,107,332 | 4/1992 | Chan ....................................... 358/518 |
| 5,185,673 | 2/1993 | Sobol ...................................... 358/296 |
| 5,220,417 | 6/1993 | Sugiura . |
| 5,267,030 | 11/1993 | Giorgianni et al. ..................... 358/527 |
| 5,309,257 | 5/1994 | Bonino et al. .......................... 358/504 |
| 5,432,906 | 7/1995 | Newman et al. ....................... 345/501 |
| 5,485,284 | 1/1996 | Shono et al. ............................ 358/504 |
| 5,489,998 | 2/1996 | Yamada et al. ......................... 358/523 |
| 5,710,644 | 1/1998 | Ohta ....................................... 358/518 |

FOREIGN PATENT DOCUMENTS

| | | | |
|---|---|---|---|
| 3408321 | 9/1984 | Germany ......................... | H04N 1/32 |
| 4034540 | 5/1991 | Germany ......................... | G06F 15/70 |
| 2240234 | 7/1991 | United Kingdom ............. | H04N 1/46 |
| 2242290 | 9/1991 | United Kingdom ............. | G06F 5/00 |

OTHER PUBLICATIONS

Proceedings, The Sixth International Congress On Advances In Non–Impact Printing Technologies, Oct. 21–26, 1990, Orlando, Florida (US), The Society For Imaging Science and Technology, Springfield, Va. (US), T. Yamasaki; "Optimum Color Space For Color Data Exchange and Its Mutual Transformation To Other Color Spaces".

*Primary Examiner*—Scott Rogers
*Attorney, Agent, or Firm*—Fitzpatrick, Cella, Harper & Scinto

[57] ABSTRACT

A color processing method utilizing a plurality of devices having different color spaces as one virtual device. A scanner inquires a computer of color space and presence/absence of a color conversion function. If the computer has the color space conversion function, the scanner transmits color image data with parameters for converting the data into data of the color space of the computer. Inversely, the computer inquires the printer of color space and presence/absence of a color space conversion function. If the printer has the color space conversion function, the computer transmits color image data with parameters obtained from operation of parameters for converting the color space of the image data into the color space of the printer and the parameters received from the scanner.

14 Claims, 15 Drawing Sheets

FIG. 5

COLOR SPACE LIST PACKET

| | |
|---|---|
| PACKET ID | COLOR SPACE LIST |
| COMMAND ID | COLOR SPACE |
| LENGTH | 3 |
| CONTENT (COLOR SPACE) | "RGB" |
| COMMAND ID | CAPABILITY |
| LENGTH | 1 |
| CONTENT (CAPABILITY) | YES |
| TERMINATOR | 0 |

FIG. 7

COLOR SPACE SELECT Ack PACKET

| | |
|---|---|
| PACKET ID | CLOLOR SPACE SELECT Ack |
| COMMAND ID | COLOR SPACE |
| LENGTH | 3 |
| CONTENT (COLOR SPACE) | "RGB" |
| COMMAND ID | COLOR METHOD |
| LENGTH | 1 |
| CONTENT (COLOR METHOD) | WITH FILTER |
| TERMINATOR | 0 |

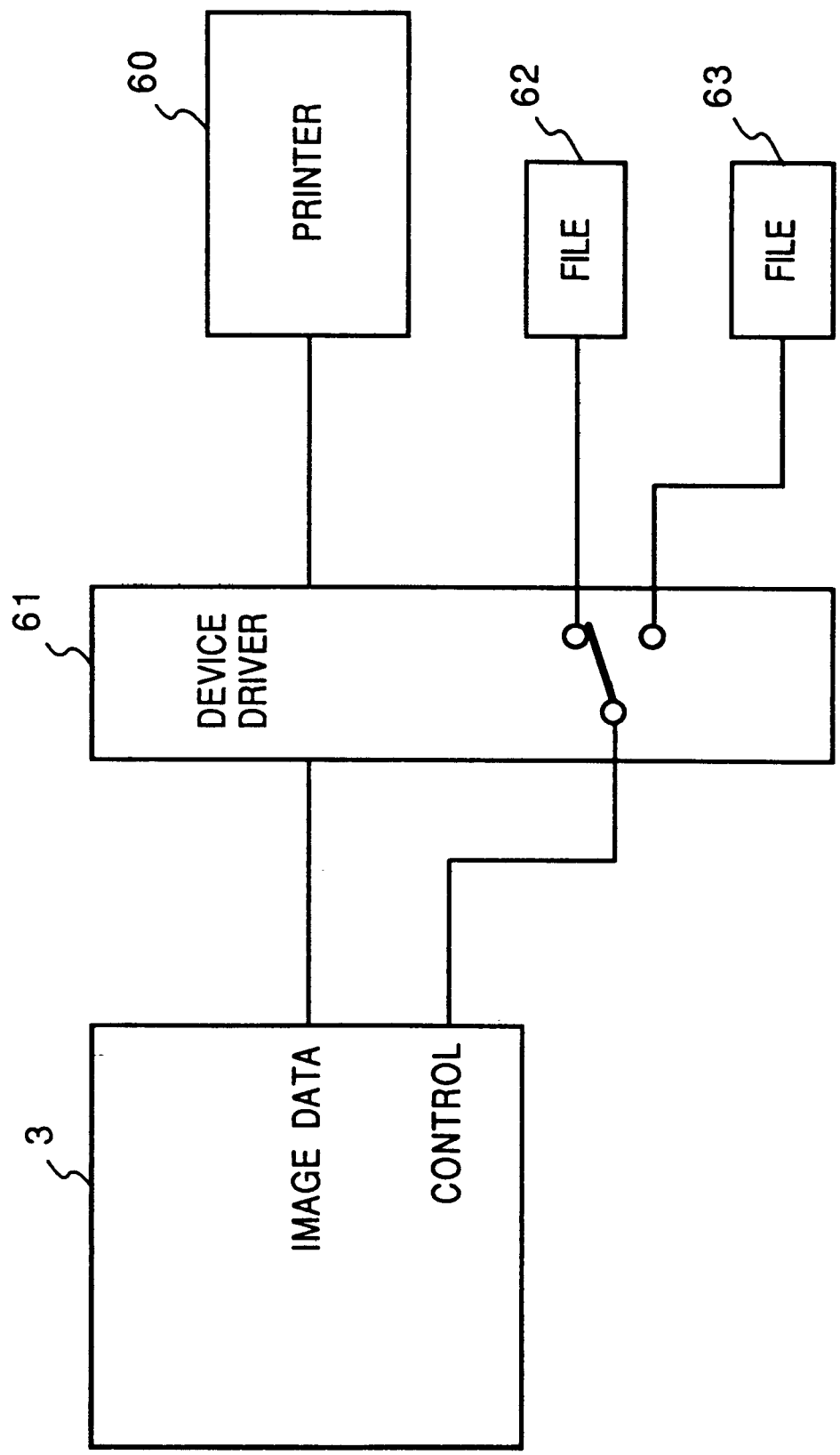

COLOR PROCESSING METHOD

This application is a division of application Ser. No. 08/097,035 filed Jul. 27, 1993 now U.S. Pat. No. 5,699,489.

BACKGROUND OF THE INVENTION

Present invention relates to a color processing method for correcting the difference among color spaces of color image input/output devices. The correction is performed when the output device such as a printer outputs a color image from e.g. a computer, when a color image is inputted into a computer from the input device such as a scanner or an electronic camera, or when a computer transmits color image data to another computer.

For example, even if various devices such as a computer, a scanner, an electronic camera and a printer can represent the same RGB color-components, each device has its own sensitivity to RGB color-components. For this reason, the printed results often disagree with the users' intention. Further, in a case where a single computer selectively uses a plurality of printers, color reproduction usually differs at each printer. In this case, the printed results may be different.

To avoid such inconvenience, a computer having high-operation capability performs appropriate color correction for each device. In case of an application software, it opens the menu so that the user can select necessary color space for a current printer/scanner.

However, the conventional color correction possesses the following drawbacks:

(1) As printers and scanners increase in varieties, difficulties in Color-Space-Selection occur on the application software side.

(2) The application software operator is in charge of correction, i.e., the user should perform color correction.

These problems are serious when sharing a plurality of scanners and printers by a plurality of computers via a network.

SUMMARY OF THE INVENTION

The present invention has been made in consideration of the above situation, and has as its object to provide a color processing method and color image processing apparatus which enables using a plurality of devices, each of which has its own color space, as one virtual device.

According to the present invention, the foregoing object is attained by providing a color processing method for a computer system having a plurality of device drivers respectively for image input/output devices and a plurality of color correction means for the input/output devices corresponding to the respective device drivers, the computer system processes color image data, comprising the steps of: performing color correction of the input/output devices by instructing the respective device drivers; and holding the color-corrected data by the respective device drivers.

Another object of the present invention is to provide a color processing method and apparatus which enables color space conversion with high-precision.

Still another object of the present invention is to provide a color processing method and apparatus which lowers load of a host computer.

Further object of the present invention is to provide an image processing system having a novel function and a device constituting the system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates Color-Space-List packet used in the color space control protocol;

FIG. 7 illustrates Color-Space-Select Ack packet used in the color space control protocol;

FIG. 15 is a block diagram for explaining a color correction data control method.

DETAILED DESCRIPTION OF THE PREFERRED EMBODIMENTS

Preferred embodiments of the present invention will be described in detail in accordance with the accompanying drawings.

Normally, connection between a computer and a printer is physical connection via e.g. a cable using a centronics interface. As is apparent from a network printer connected to a local area network (LAN), it is wrong to regard a cable as a "physical and logical" connecting point. A cable is a physical connecting point, however, if it is also a logical connecting point, an application software should be able to change the physical specification of each printer or scanner.

To avoid this problem, when an input/output device provided by an input/output device maker is connected to a computer, a device driver is installed into an operating system (OS) of the computer.

The present embodiment realizes an interface between the input/output devices such as printer and a scanner by virtualizing the following four items:

(1) Logical connecting point (2) Standard color space (3) Virtual color correction (virtual color space conversion)

(4) Virtual Color Space Conversion Protocol

[Logical Connection]

Figure 1:
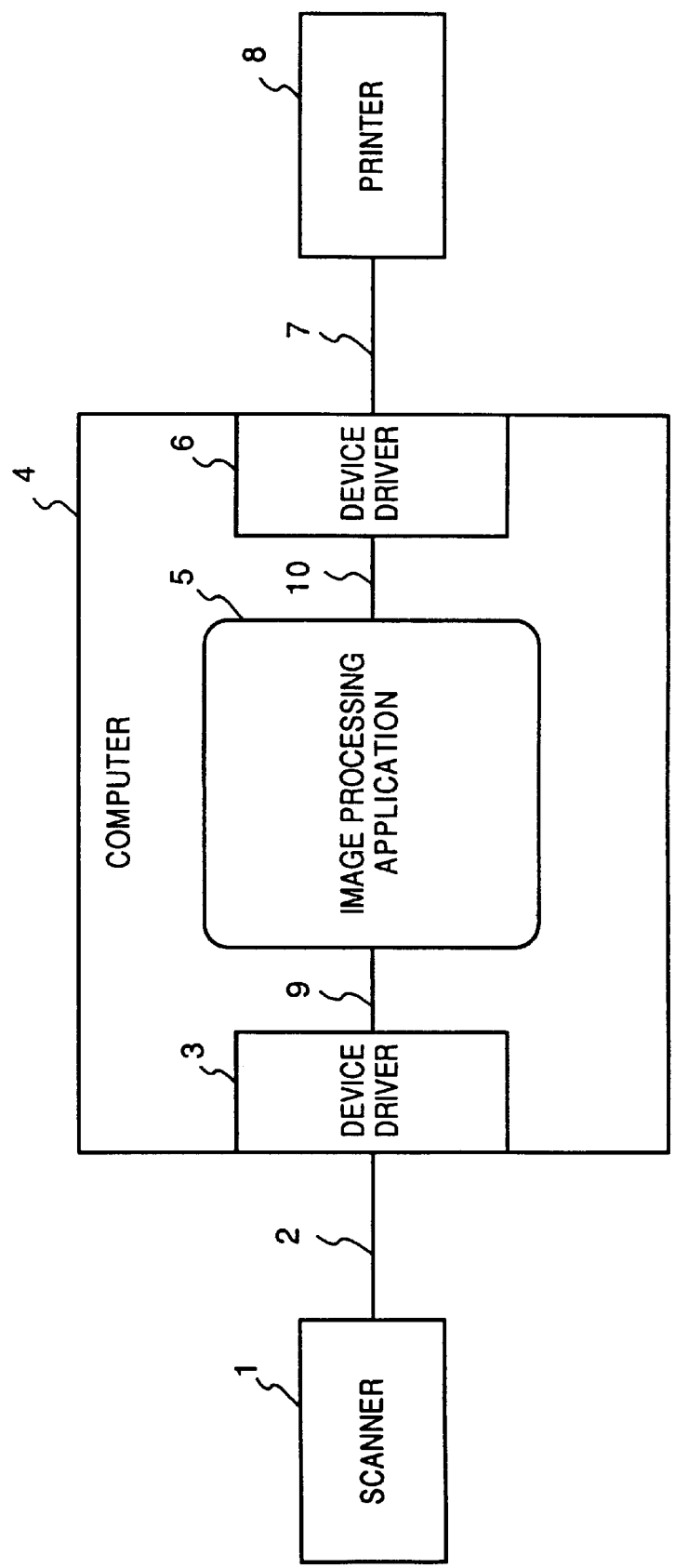
FIG. 1 is a block diagram schematically showing the system configuration of an embodiment of the present invention.

FIG. 1 is a block diagram showing the system configuration embodying the present invention. In FIG. 1, reference numeral 1 denotes a scanner; 2, a connection cable; 3, a device driver of the scanner; 4, a computer; 5, an image processing application, e.g., a color DTP soft; 6, a device driver of printer 8; and 7, a connection cable. Device drivers 3 and 6 exist in the computer 4 and they are connected via programmable connection paths 9 and 10 to each other.

Conventionally, a color image data interface is defined by physical connecting points (cables 2 and 7) between the input/output devices 1 and 8. In the present embodiment, however, the interface is defined by logical connecting points (paths 9 and 10). More specifically, the device driver 3 exists in the computer 4 physically, however, the device driver 3 can be logically considered as a part of the scanner 1. Also, the device driver 6 which exists in the computer 4 physically can be regarded as a part of the printer 8.

Accordingly, the difference of color space between the computer 4 and the scanner 1 or the printer 8 can be easily corrected by using the interfaces 9 and 10 between the device drivers 3 and 6 as logical connecting points for color correction. The connection paths 9 and 10 will be referred to as "logical connecting points" hereinafter.

In this embodiment, the respective logical connections are provided with standard color space around them. If the computer 4 uses RGB color space and the printer 8 uses YMC color space, the device driver 6 performs RGB→YMC conversion.

[Color Correction at Logical Connecting Point]

The color correction at a logical connecting point can be applied not only to the color space conversion between different color spaces, but to conversion between the same color spaces. For example, the scanner 1 normally outputs RGB signals and the computer 4 often uses RGB color space as its standard color space. In many cases, the white balance of the scanner 1 and that of the computer 4 are subtly different. Conventionally, the user has manually adjusted such subtle difference or has done nothing and abandoned the difference. Assuming that the color space of the scanner 1 is R'G'B', correction to the scanner 1 color space should be made by the device driver 3. That is, color correction should be preferably performed at a logical connecting point.

[Introduction of Standard Color Space]

As described above, it is not appropriate to assume the color space of the scanner 1 "R'G'B'" and that of the computer 4 "RGB", since a well-designed standalone scanner performs color correction before it outputs a color signal. If the scanner color space RGB is standard, the computer 4 color space should be non-standard. Unfavorably, the misunderstanding that computers always have standard color space derives from the fact that they treat digital numerical values while scanners including a light source and a image sensor treat analog values. In fact, however, a color based on a value set on the computer is unknown until the data is displayed on a CRT display and becomes visible color to human eyes. For this reason, the computer numerical values cannot be determined correct unless the CRT display is properly adjusted. Usually, color correction is performed at the devices not in a computer, because the computer controls all the devices and therefore the color correction cannot be performed in the computer. In this case, however, the color correction is performed on the assumption that the computer has correct color space.

[Contradiction in Color Correction by Computer]

As in many systems, it is convenient to perform final color correction by a computer. However, it is very incredible considering the above-mentioned fact that computer do not always have correct color space. For example, in an application software, a scanner can be driven using a command in the menu. It seems very convenient because the application can directly drive the scanner. In fact, a long list of scanners is displayed in the menu, then a corresponding scanner is selected, and scanning is started. As this selection is made only once, there seems no problem. However, problems occur in the following cases.

The scanner selection by the application software means the application softwares are in charge of setting the various scanners. Also color correction should be made by the application software. When there existed only a few types of black-and-white scanners in the market, an application software was able to perform color correction. Now there are variety of scanners such as a scanner for black-and-white half-tone and a color scanner, color correction by the application is insufficient. Device driver should clarify that the scanner side should be in charge of color correction. Even in a case where a system can provide only one scanner to a user, the system should have a construction connectable to a scanner of any type without adjustment.

[Setting of Standard Color Space]

In the present embodiment, standard color space is provided at the logical connecting points in order to solve the above-mentioned problems and contradiction. Equation 1 is for converting color space "R'G'B'" into color space "RGB". $[f_{11}, f_{12}, \ldots, f_{33}]$ is a conversion coefficient matrix. Equation 2 is for converting color space "RGB" into "rgb". $[g_{11}, g_{12}, \ldots, g_{33}]$ is a conversion coefficient matrix.

Equation 3 is obtained by substituting the equation 1 into the equation 2. The conversion coefficient matrix of the equation 3 is replaced with equation 4, and the equation is expressed as equation 5. This means that once matrix operation is performed, the number of color conversion operations which should initially be performed twice can be reduced to once. The conversion coefficient matrices $[f_{11}, f_{12}, \ldots, f_{33}]$ and $[g_{11}, g_{12}, \ldots, g_{33}]$ are represented as $[F]$ and $[G]$ in equations 6 and 7 for the sake of simplicity.

$$\begin{bmatrix} R \\ G \\ B \end{bmatrix} = \begin{bmatrix} f_{11} & f_{12} & f_{13} \\ f_{21} & f_{22} & f_{23} \\ f_{31} & f_{32} & f_{33} \end{bmatrix} \begin{bmatrix} R' \\ G' \\ B' \end{bmatrix} \quad (1)$$

$$\begin{bmatrix} r \\ g \\ b \end{bmatrix} = \begin{bmatrix} g_{11} & g_{12} & g_{13} \\ g_{21} & g_{22} & g_{23} \\ g_{31} & g_{32} & g_{33} \end{bmatrix} \begin{bmatrix} R \\ G \\ B \end{bmatrix} \quad (2)$$

$$\begin{bmatrix} r \\ g \\ b \end{bmatrix} = \begin{bmatrix} g_{11} & g_{12} & g_{13} \\ g_{21} & g_{22} & g_{23} \\ g_{31} & g_{32} & g_{33} \end{bmatrix} \begin{bmatrix} f_{11} & f_{12} & f_{13} \\ f_{21} & f_{22} & f_{23} \\ f_{31} & f_{32} & f_{33} \end{bmatrix} \begin{bmatrix} R' \\ G' \\ B' \end{bmatrix} \quad (3)$$

$$\begin{bmatrix} h_{11} & h_{12} & h_{13} \\ h_{21} & h_{22} & h_{23} \\ h_{31} & h_{32} & h_{33} \end{bmatrix} = \begin{bmatrix} g_{11} & g_{12} & g_{13} \\ g_{21} & g_{22} & g_{23} \\ g_{31} & g_{32} & g_{33} \end{bmatrix} \begin{bmatrix} f_{11} & f_{12} & f_{13} \\ f_{21} & f_{22} & f_{23} \\ f_{31} & f_{32} & f_{33} \end{bmatrix} \quad (4)$$

$$\begin{bmatrix} r \\ g \\ b \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} R' \\ G' \\ B' \end{bmatrix} \quad (5)$$

$$(F) = \begin{bmatrix} f_{11} & f_{12} & f_{13} \\ f_{21} & f_{22} & f_{23} \\ f_{31} & f_{32} & f_{33} \end{bmatrix} \quad (6)$$

$$(G) = \begin{bmatrix} g_{11} & g_{12} & g_{13} \\ g_{21} & g_{22} & g_{23} \\ g_{31} & g_{32} & g_{33} \end{bmatrix} \quad (7)$$

$$\begin{bmatrix} r \\ g \\ b \end{bmatrix} = (D)(G)(F) \begin{bmatrix} R' \\ G' \\ B' \end{bmatrix} \quad (8)$$

Figure 2:
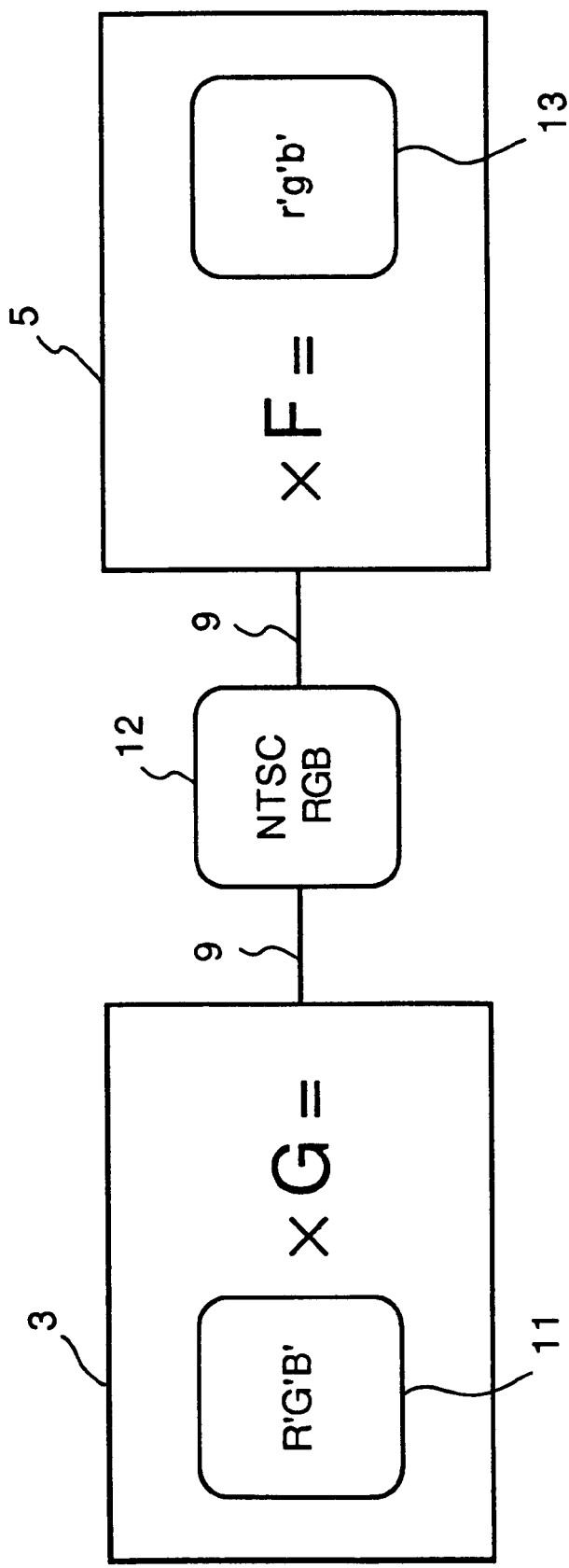
FIG. 2 illustrates a device driver in the embodiment.

FIG. 2 shows the color space characteristics of the computer 4. In FIG. 2, the elements in FIG. 1 have the same reference numerals. Reference numeral 11 denotes a color space characteristic of the scanner; 12, a standard color space characteristic; 13, a color space characteristic of the computer. These color space characteristics are represented as "R'G'B'", "NTSC RGB", and "r'g'b'" respectively. "G" is a conversion means (matrix) for converting "R'G'B'" data into "NTSC RGB" data. "F" is a conversion means (matrix) for converting "NTSC RGB" data into "r'g'b'" data.

Any appropriate color space can be employed as the standard color space here. If the data transmitting side (scanner 3) and the receiving side (computer 5) both have "RGB" color space, it should be desirably "INTSC RGB". The transmitting side converts the device color space data "R'G'B'" into the standard color space data "NTSC RGB" by the conversion means "G". The receiving side converts the standard color space data "NTSC RGB" into the device color space data "r'g'b'" by the conversion means "F".

[Virtual Color Correction (Virtual Color Space Conversion)]

The two conversion means "G" and "F" are indispensable for setting the standard color space. However, there are the following problems:

(1) The cost of the entire system increases.
(2) The throughput is degraded.
(3) Operation errors accumulate at every conversion.
(4) Color representation dynamic range becomes narrow at every conversion.

To avoid such problems, the Virtual Color Correction Concept (Virtual Color Space Conversion) is introduced in the present embodiment. The Virtual Color Correction/Virtual Color Space Conversion (hereinafter referred to as "virtual conversion") is a method for transmitting as one set an equation for converting color space into a target standard color space and initial data without operating the equation. In this method, the final operation is entrusted to the receiving side. The receiving side first operates the conversion means G and F, and multiplies the result with the initial data value. This reduces the number of the matrix operations (twice) to only once, and preventing operation errors such as a rounding error. Note that the operation is entrusted to the data receiving side only if the receiving side has the operation function. If the receiving side does not have the function, the operation is performed on the transmitting side.

[Virtual Color space Conversion Protocol]

Figure 3:
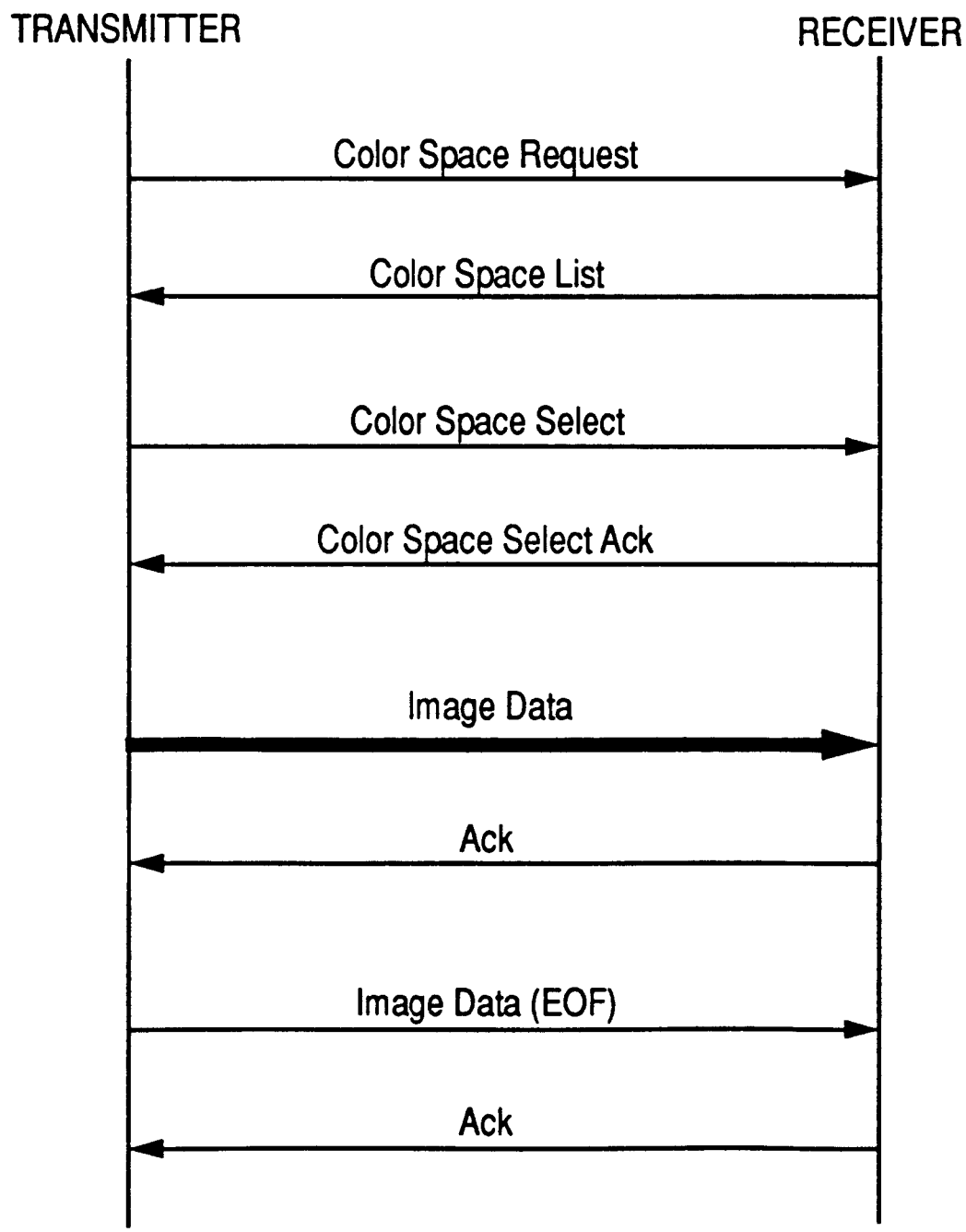
FIG. 3 is a device-independent color space control protocol in the embodiment.

FIG. 3 shows Virtual Color Space Conversion Protocol in the present embodiment. The communication between the transmitter and the receiver is performed via device drivers, and the protocol is realized by packet transmission. For example, in a case where the transmitter and the receiver perform communication within one personal computer, only a packet pointer is transmitted and an actual packet is not transmitted.

FIGS. 4 to 7 show the construction of respective packets. It should be noted that the constructions are similar to each other and therefore only Color-Space-Request packet shown in FIG. 4 will be described here. The packet includes one-byte base elements, packet ID 41, command ID 42, length 43, and content 44 from the top. The packet ID 41 has a code indicative of the type of the packet. The command ID 42 has a code indicating what the subsequent data elements represent. The length 43 shows the length of the content 44 in byte units. The command ID 42, the length 43 and the content 44 can be repeated depending upon circumstances. Terminator 45 is included at the end of the packet. The terminator 45 is a kind of command ID and is indicative of "0". The content 44 is a variable-length data whose length is defined in byte units by the length 43. Note that although the variable-length content 44 has expansivity, the content 44 can be fixed-length data.

Figure 4:
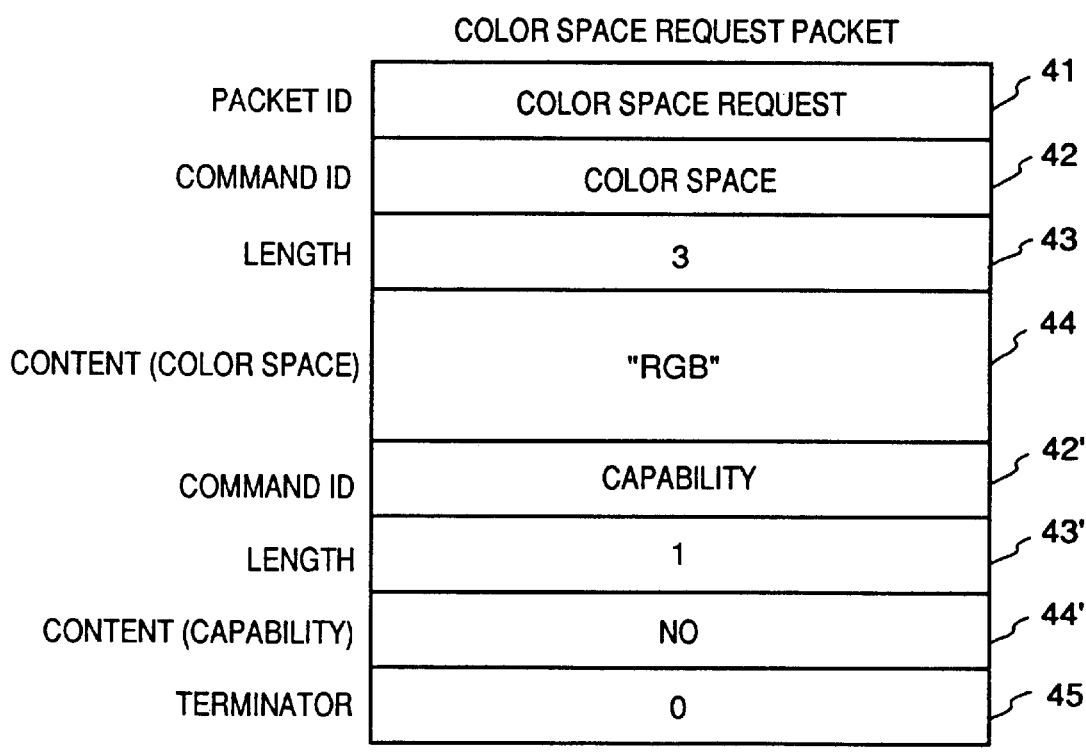
FIG. 4 illustrates Color-Space-Request packet used in the color space control protocol.

The Virtual Color Space Conversion Protocol shown in FIG. 3 will be described below. First, the transmitter transmits the Color-Space-Request packet to the receiver, to specify the color space of image data to be transmitted and inquire of the receiver's color space. At the same time, the transmitter informs the receiver of presence/absence of a color conversion function. As shown in FIG. 4, the transmitter transmits data in accordance with "RGB" color space, and informs that there is no color conversion function ("No") on the transmitting side. On the other hand, the receiver returns a Color-Space-List packet to the Color-Space-Request packet, to inform the transmitter of a list of acceptable color spaces. As shown in FIG. 5, the receiver receives in accordance with "RGB" color space and informs that there is a color conversion function ("Yes") on the receiving side.

Figure 6:
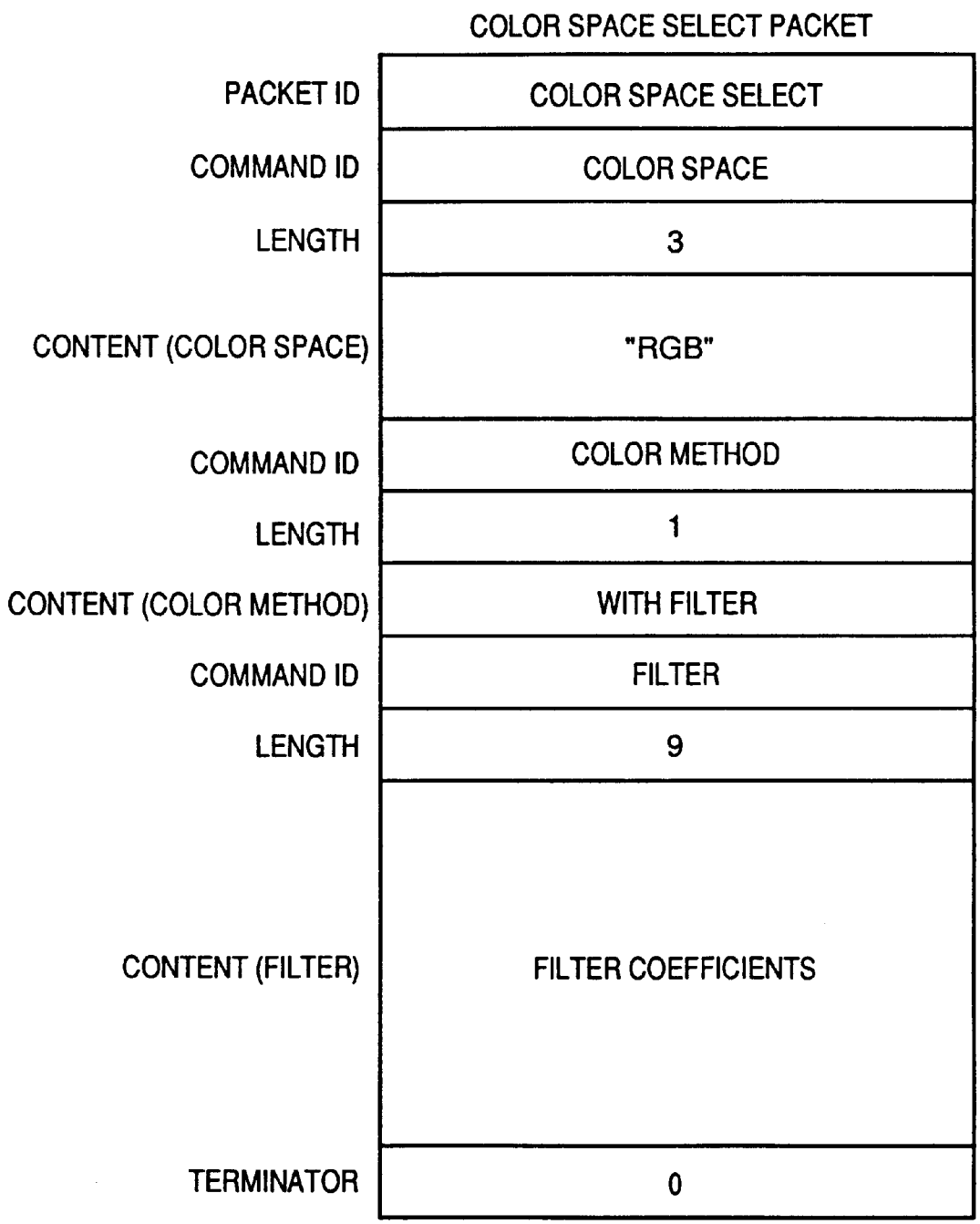
FIG. 6 illustrates Color-Space-Select packet used in the color space control protocol.

The transmitter transmits a Color-Space-Select packet as shown in FIG. 6 to determine the color space and data format to be used. For example, the employed color space data is "RGB" and the data is to be transmitted with virtual color correction parameters. This packet includes filter coefficients for color space correction. The receiver acknowledges the color space and the data format to be used by Color-Space-Select Ack packet as shown in FIG. 7. The transmission can be made without acknowledgment, and the Color-Space-Select Ack packet can be optional.

Next, a case where scanners and printers are connected to a computer via a network will be described. In this example, the transmitter is a Macintosh by Apple Computer (hereinafter referred to as "S/P Client"), the receiver is a standalone network scanner printer server (hereinafter referred to as "S/P Server"). In this system, the transmitter and the receiver are connected via a communication protocol. Generally, the Local talk is used for Macintosh, however, to have the machine coexist with e.g. the UNIX environment represented by the SUN, the TCP/IP protocol is suitable. For this reason, the MacTCP which is the TCP/IP protocol for Macintosh is employed as the communication protocol in this system.

The functional elements in this system are PrintTCP, the SP Client, the SP Server, and the MacTCP.

The PrintTCP and the SP Client and the MacTCP are installed into the Macintosh. The PrintTCP is a scanner printer driver for outputting data to a scanner printer server on the Ethernet via the TCP/IP from an application of the Macintosh. The basic functions of the PrintTCP is as follows:

(1) To generate, when the QuickDraw subroutine is called upon printing, a CaPSL (Canon Printing System Language) code equivalent to the subroutine. The CaPSL is a printer language by Canon K.K.

(2) To generate, as a CaPSL code, bit map halftone image data (color/black-and-white) compressed by the ADCT (Adaptive Discrete Cosine Transformation) transformation based on the JPEG (Joint Photographic coding Experts Group) standards as an optional function.

(3) To transmit the generated CaPSL code to the S/P Server via the S/P Client driver.

The SP Client is a communication control program for transmitting a CaPSL code to the printer connected to the S/P Server via the TCP/IP and the Ethernet. The SP Client has the following basic functions:

(1) To link end-to-end the S/P Client and the S/P Server via the TCP/IP.

(2) To transmit CaPSL data received from the PrintTCP to the S/P Server.

(3) To have the S/P Server scan an original, then receive the scanned data, and transmit the received data to the application.

The SP Server always runs on the S/P Server as a demon, while waiting for data reception from the client. The basic functions of the SP Server are as follows:

(1) To pass the CaPSL data from the S/P Client to CaPSL interpreter.

(2) To start an original scanning program and transmit received scanned data to the S/P Client.

Figure 8:
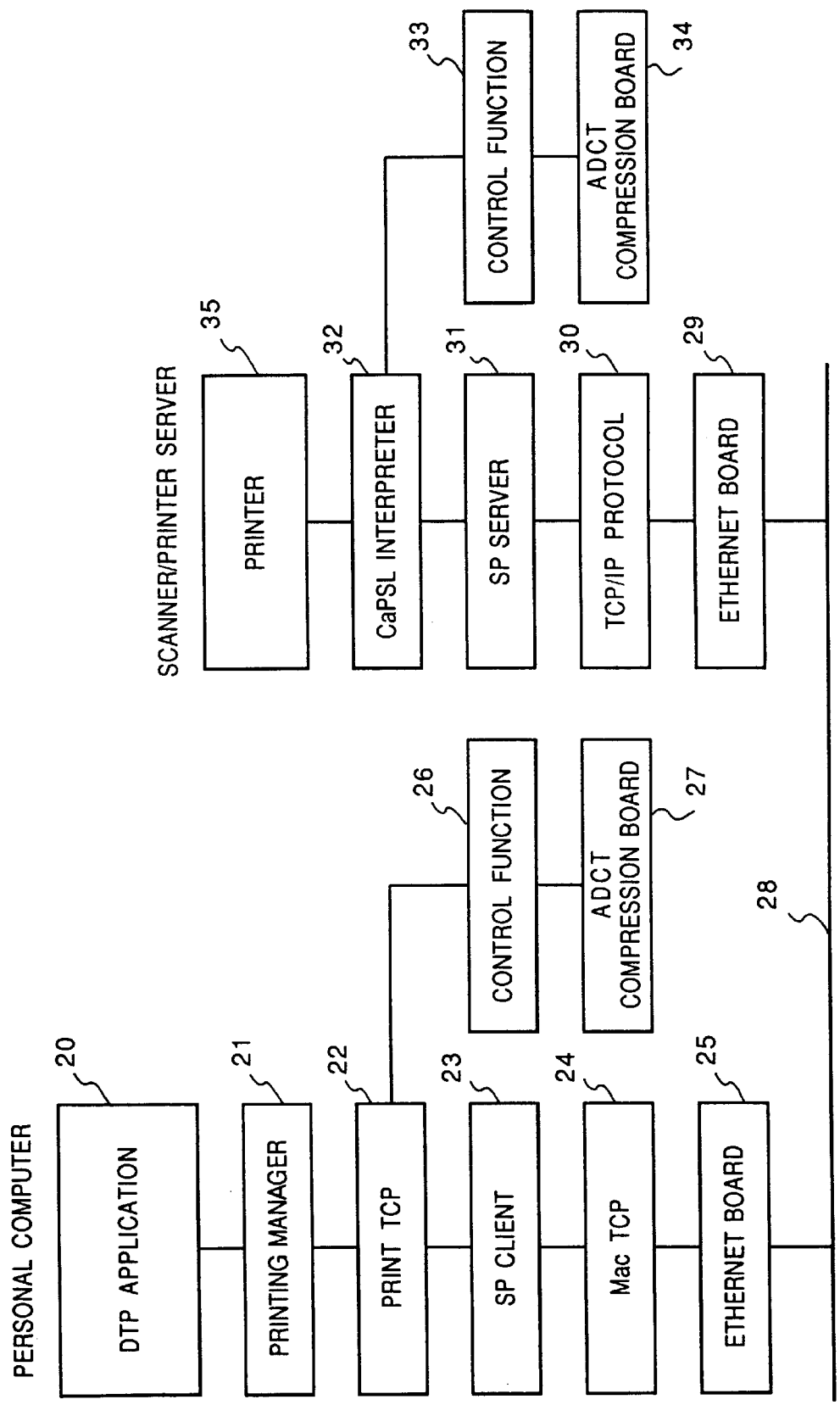
FIG. 8 is a block diagram showing the configuration of a server/client system to which the present embodiment is applied.

FIG. 8 shows the relation between these programs. The format and function of the resources of the respective program units are as follows:

(1) Printing Manager: to call a subsequent printer driver installed in the system as a standard driver. Type=DRVR, iPrDrvRef=−3

(2) PrintTCP: initially this printer driver is not installed in the system. It is provided as a code resource in the form of Chooser Document so as to be selected from the Chooser DA with Laser Writer and Image Writer.

(3) SP Client: this driver automatically installs itself in the system by INIT-31 mechanism upon starting of the system.

(4) MacTCP: this driver also has the resource "Control Panel Document". It sets initial values such as IP address from the control DA.

(5) SP Server: It is a FSX server side program which exists in the form of e.g. a demon of the UNIX.

In FIG. 8, reference numeral 20 denotes a DTP application on the market; 21, the Printing Manager which always exists in the OS; 22, the PrintTCP; 23, the SP Client; 24, the MacTCP; 25, an Ethernet board; 26, a control function of ADCT board; 27, an ADCT compression board; 28, an Ethernet Cable; 29, an Ethernet board; 30, the TCP/IP protocol which always exists in the UNIX; 31, the S/P server; 32, the CaPSL interpreter; 33, a control function of the ADCT board; 34, an ADCT compression board; and 35, the printer. Numerals 20 to 25 denote the Macintosh; 29 to 34, NWSP; 25 and 29, hardware for providing a communication function via the cable 28. Actual logical communication path can ensured by the MacTCP 24 and the TCP/IP 30. The SP Client 23 and the SP Server 31 form an end-to-end printer server/client protocol on a logical communication path provided by the TCP/IP 30. The purpose of this protocol is to serve as a driver to divert the application 20 from its attention to the network (Ethernet) and have the application regard the printer 35 as if it is connected to local computers. In other words, to the application 20, the printer 35 seems directly connected under the Printing Manager 21.

Figure 9:
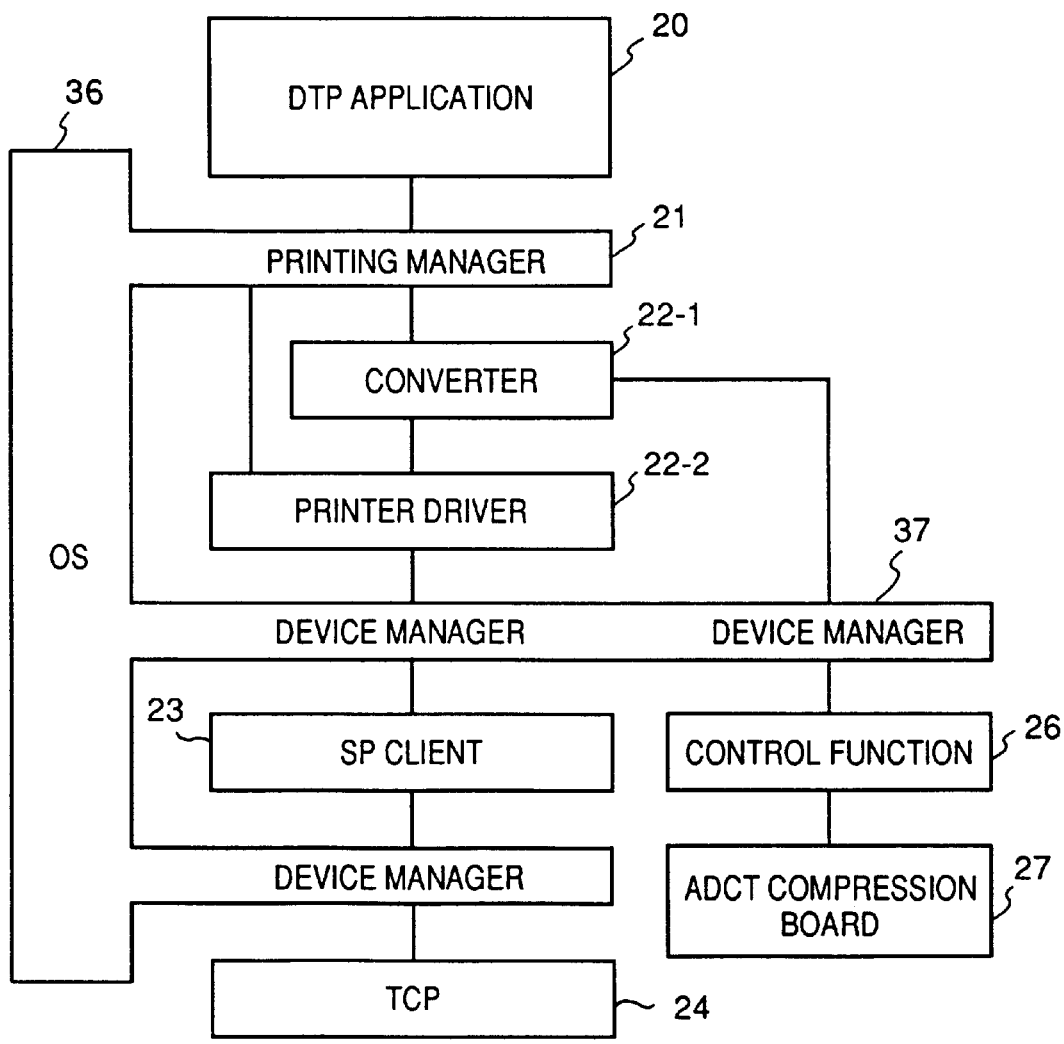
FIG. 9 is a block diagram showing in detail a client side of the server/client system.

FIG. 9 shows in detail the relation between the computer side and the OS 36. As shown in FIG. 9, the Printing Manager 21 is a part of the OS 36. The PrintTCP 22 and the SP Client 23, the SP Client 23 and the Mac TCP, the PrintTCP and the control function 26 perform communication via a device manager 37. The PrintTCP 22 is divided into QuickDraw-CaPSL converter 22-1 and printer driver 22-2. The converter 22-1 replaces the QuickDraw subroutine with a CaPSL code. This operation enables the SP Server having the CapSL interpreter to emulate the QuickDraw in place of the QuickDraw. Constructing the system using the respective drivers as drivers not applications provides the greatest merit of easy standardization of specification, since the interface is connected via the OS 36. Further, if the OS is actually a single task OS, though the OS is the Multifinder, drivers at the corresponding parts can be multitasked. For example, in case of the UNIX, only an interface to a physical device can be a driver and the other interfaces can be demons to run on the background.

[SP Client Format]

The SP Client driver automatically installs itself in the system by the INIT-31 mechanism upon turning on the power. When the driver memory size becomes greater, most codes are held in the form of code resource, and when the driver is opened, the resources are loaded on the system heap. In this case, the memory is freed when closing. The driver name begins with a period (".").

Further, the SP Client has the Control Panel Document resource. It can set various parameters such as the IP address from the Control Panel. For this purpose, it has resources as follows:

DITL ID=−4064 mach ID=−4064 nrct ID=−4064

ICN# ID=−4064

BNDL ID=−4064

FREF ID=−4064 cdev ID=−4064

[SP Client Driver Interface]

The SP Client provides the following hi-level deice manager routines:

DriverOpen

DriverClose

Control

FSRead

FSWrite

Status

KillIO

Other services of the SP Client than the above in the standard driver interface can be provided by Control routine. Various commands as listed below can be used by setting a cs code of the Control call's parameter block to a predetermined value:

SPSetInit

SPListen

SPCapability

Color-Space-Request

Color-Space-List

Color-Space-Select

Color Space Ack

[Explanation of Commands]

The commands are as shown in table 1.

TABLE 1

| | | | | |
|---|---|---|---|---|
| DriverOpen | <item> | <define> | <content> | <example, comment> |
| | parameter | host | host name | |
| | | wind | window size | (1,2,3,4) |
| | | *buffer | buffer pointer | (SPOpen result) |
| | return: | OsErr | result | |
| | | refnum | port ref.No. | (hereinafter this No.) |
| DriverClose | <item> | <define> | <content> | <example, comment> |
| | parameter | refnum | port ref.No. | |
| | return: | OsErr | result | |
| FSRead | <item> | <define> | <content> | <example, comment> |
| | parameter | refnum | port ref.No. | |
| | | *buffer | buffer pointer | (received data buffer) |
| | return: | OsErr | result | |
| | | RxSize | data size | (received data size) |
| | | EOF | End of File | data termination flag |
| FSWrite | <item> | <define> | <content> | <example, comment> |
| | parameter | refnum | port ref.No. | |
| | | *buffer | buffer pointer | (transmission data buffer) |
| | | size | data size | (transmission data size) |
| | | EOF | End of File | (data termination flag) |
| | return: | OsErr | result | |
| Status | <item> | <define> | <content> | <example, comment> |
| | parameter | host | host name | |
| | | *buffer | buffer pointer | (SPStatus result) |
| | return: | OsErr | result | |
| Control | <item> | <define> | <content> | <example, comment> |
| | parameter | refnum | port ref.No. | |
| | | *buffer | buffer pointer | (data buffer) |
| | | size | data size | (data size) |
| | return: | OsErr | result | |
| SPInit csCode = cSPInit server first issues it & prepares reception | | | | |
| | <item> | <define> | <content> | <example, comment. |
| | parameter | host | host name | |
| | | Wind | window size | (1,2,4,8) |
| | | *buffer | buffer pointer | (SPOpen result) |
| | return: | OsErr | result | |
| | | refnum | port ref.No. | (hereinafter this No.) |
| SPListen csCode = cSPListen server issues it & acknowledges reception | | | | |
| | <item> | <define> | <content> | <example, comment> |
| | parameter | refnum | port ref.No. | |
| | return: | OsErr | result | |
| SPSetStatus csCode = cSPStatus server issues it & changes S/P server setting | | | | |
| | <item> | <define> | <content> | <example, comment> |
| | parameter | refnum | port ref.No. | |
| | | newStatus | new status setting value | |
| | return: | OsErr | result | |

[Packet Format]

Figure 10:
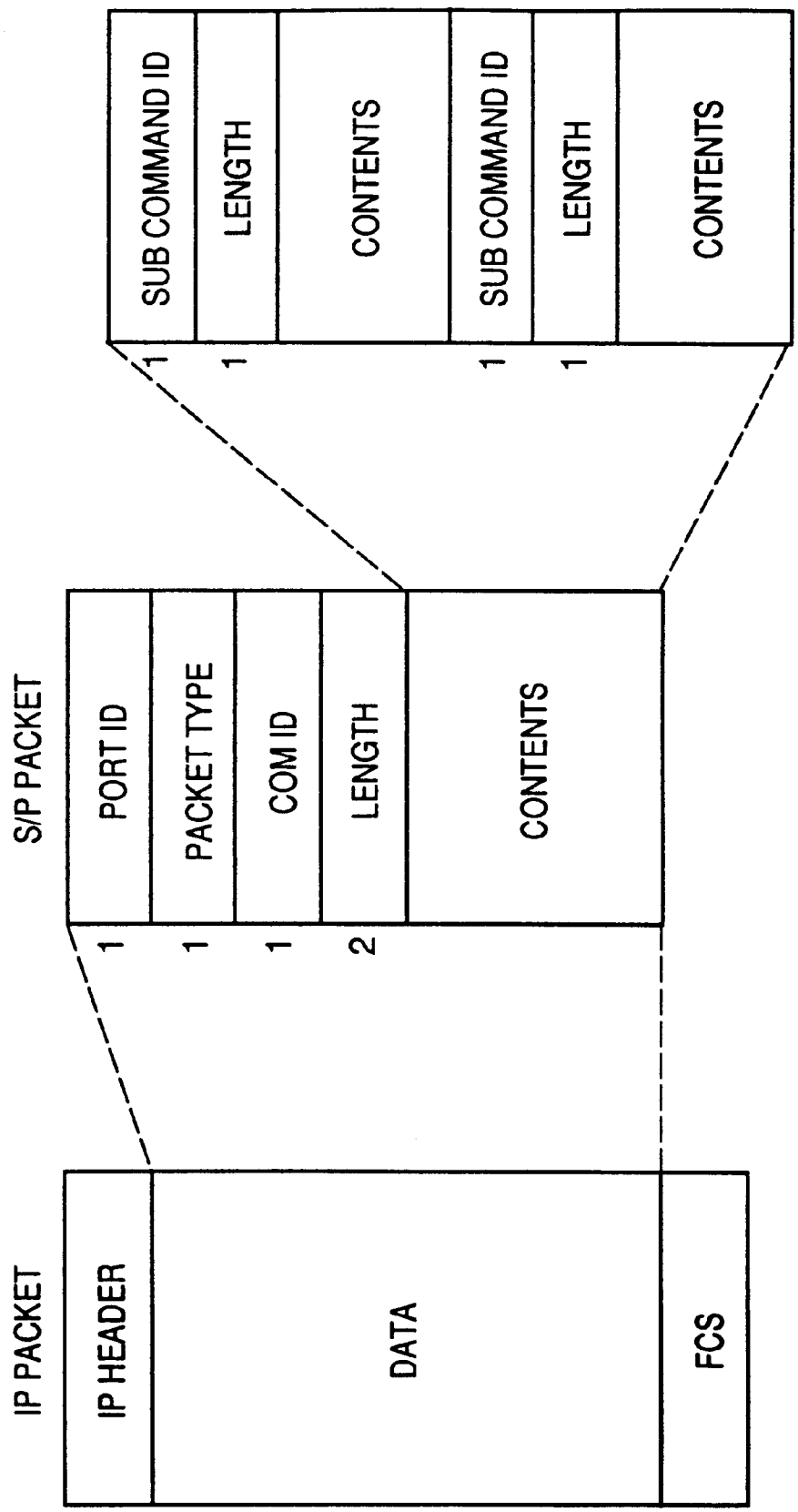
FIG. 10 illustrates a general packet construction used in the color space control protocol.

General packet format of the SP Server/Client protocol is as shown in FIG. 10. In FIG. 10, numerals allotted at the left side indicates the number of bytes.

[Packet Functions]

The functions of the SCCL packet and the DVCL packet are as shown in Tables 2 and 4.

TABLE 2

| | |
|---|---|
| OpenConn | set server/client link, ensure virtual communication line inform server/client communication function to opposite end |
| Open ConnReply | acknowledge server/client link acknowledge server/client link communication function establish connection number (Conn-ID) |
| CloseConn | disconnect server/client link |
| Data | data |
| Ack | acknowledge data transmission |
| Nack | acknowledge data transmission, control flow |
| Status | inquire of server/client link status |
| StatusReply | reply to Status; one of RR,RNR,Status ACK,Abort |
| Abort | disconnect communication |
| Control | control server/client (all services except data to PrintTCP) |

TABLE 3

<DVCL Packet>

| | |
|---|---|
| Init(com-id = fxInit) | :SPServer initialization request |
| device = <device-name> | (e.g. Print,Scan,Get,Give) |
| direction = <data-direction> | (e.g. CaPSL,Postscript,HPGL) |
| PDL = <language> | (e.g. A4,A3) |
| paper = <paper-size> | (e.g. Landscape,Portrait) |
| scape = <scape-type> | (e.g. 100,200,300,400) |
| resolution = <dpi> | (eg.BK,RGB,RGBX,CMYK, LAB,XYZ,YCrCb) |
| color = <color-space> | |
| InitAck(com-id = fxInitAck) | :SPServer initialization response |
| result = <result-code> | (e.g. noErr,Error) |
| Scan(com-id = fxScan) | :scanning start request |
| paper = <paper-size> | (e.g. A4,A3) |
| scape = <scape-type> | (e.g. Landscape,Portrait) |
| resolution = <dpi> | (e.g. 100,200,300,400) |
| color = <color-component> | (e.g. R,G,B,C,M,Y,K,X,) |
| ScanAck(com-id = fxScanAck) | :scanning start response |
| result = <result-code> | (e.g. noErr, Error) |
| which-image = <image-id> | (e.g. 1, 2, 3 ... ) |
| Print(com-id = fxPrint) | :printing start request |
| paper = <paper-size> | (e.g. A4, A3) |
| scape = <scape-type> | (e.g. Landscape, Portrait) |
| resolution = <dpi> | (e.g., 100, 200, 300, 400) |
| color-compo = <color-component> | (e.g. R,G,B,C,M,Y,K,X) |
| pages = <number-of-pages> | (e.g. 1–99) |
| PrintAck(com-id = fxPrintAck) | :printing start response |
| result = <result-code> | (e.g. A4, A3) |
| which-image = <image-id> | (e.g. 1,2,3 ... ) |
| queue-number = <number> | (e.g. 1,2,3 ... all) |
| Capability(com-id = fxCapability) | :SPServer function acknowledgment request |
| CapabilityAck(com-id = fxCapabilityAck) | :SPServer function acknowledgment response |
| device = <device-name> | |
| direction = <data-direction> | (e.g. Print,Scan,Get,Give) |
| PDL = <language> | (e.g. CaPSL,Postscript,HPGL) |
| paper = <paper-size> | (e.g. A4,A3) |
| scape = <scape-type> | (e.g. Landscape,Portrait) |
| color = <color-space> | (eg.BK,RGB,RFBX,CMYK, LAB,XYZ,YCrCb) |
| SetArea(com-id = fxSetArea) | :original image effective area setting request |
| area = <print-area> | (e.g. top,lef,bottom,right) |
| SetAreaAck(com-id = fxSetAreaAck) | :original image effective area setting response |
| which-image = <image-id> | (e.g. 1,2,3 ... ) |
| result = <result-code> | (e.g. noErr,Error) |
| SetColor(com-id = fxSetColor) | :color designation request |
| which-image = <image-id> | (e.g. 1,2,3 ... ) |
| color = <color-space> | (eg.BK,RGB,RGBX,CMYK, |

TABLE 3-continued

<DVCL Packet>

| | |
|---|---|
| color compo = <color-component> | LAB,YXZ,YCrCb)<br>(e.g. R,G,B,C,M,Y,K,X) |
| SetColorAck(com-id = fxSetColorAck) | :color designation response |
| result = <result-code> | (e.g. noErr,Error) |
| BufFlush(com-id = fxBufFlush) | :image memory clear request |
| which-image = <image-id> | (e.g. 1,2,3 . . . ) |
| BufFlushAck(com-id = fxBufFlushAck) | :image memory clear response |
| result = <result-code> | (e.g. noErr,Error) |

TABLE 4

| | |
|---|---|
| ClearQueue(com-id = fxClearQueue) | :printer queue clear request |
| queue-number = <number> | (e.g. 1,2,3 . . . all) |
| ClearQueueAck(com-id = fxClearQueueAck) | :printer queue clear acknowledgment |
| result = <result-code> | (e.g. noErr,Error) |
| Comp(com-id = fxComp) | :image compression request |
| which-image = <image-id> | (e.g. 1, 2, 3 . . . ) |
| type = <compression type> | (e.g. JPEG, MH,MR,MMR) |
| CompAck(com-ide = fxCompAck) | :image compression acknowledgment |
| which-image = <image-id> | (e.g. 1,2,3 . . . ) |
| result = <result-code> | (e.g. noErr, Error) |
| Decomp(com-id = fxDecomp) | :image expansion request |
| which image = <image-id> | (e.g. 1, 2, 3 . . . ) |
| type = <compression type> | (e.g. JPEG,MH,MR,MMR) |
| DeCompAck(com-id = fxDeCompAck) | :image expansion acknowledgment |
| which-image = <image-id> | (e.g. 1,2,3 . . . ) |
| result = <result-code> | (e.g. noErr,Error) |
| DIR(com-id = fxDIR) | :directory request |
| DIRAck(com-id = fxDIRAck) | :directory response |
| directory = <directory> | (e.g. /home/user-name/file-name) |
| CD(com-id = fxCD) | :directory change request |
| directory = <directory> | (e.g. /home/user-name/file-name) |
| CDAck(com-id = fxCDAck) | :directory change response |
| result = <result-code> | (e.g. noErr,Error) |
| Get(com-id = fxGet) | :file transmission request |
| data = <data> | |
| GetAck(com-ide = fxGetAck) | :file transmission acknowledgment |
| result = <result-code> | (e.g. noErr,Error) |
| Put(com-id = fxPut) | :file reception request |
| data = <data> | |
| PutAck(com-id = fxPutAck) | :file reception acknowledgment |
| result = <result-code> | (e.g. noErr,Error) |
| Cancel(com-ide = fxCancel) | :scanner server operation, setting cancellation |
| result = <result-code> | (e.g. noErr,Err) |
| Color-Space-Request(com-id = Color-Space-Request) | :transmitter's color space request and color processing function |
| Color Space | color space name |
| Capability | color processing capability |
| Color-Space-List(com-id = Color-Space-List) | :receiver's color space list and color processing function |
| Color-Space | color space name |
| Capability | color processing capability |
| Color-Space-Select(com-id = Color-Space-Select) | :transmitter's color space designation and color processing method designation |
| Color-space | color space name |
| Color-Method | color processing method |
| Color-Space-Select Ack(com-id = Color-Space-Select Ack) | :receiver's color space acknowledgment and color processing method |
| Color-space | color space name |
| Color-Method | color processing method |

Figure 11:
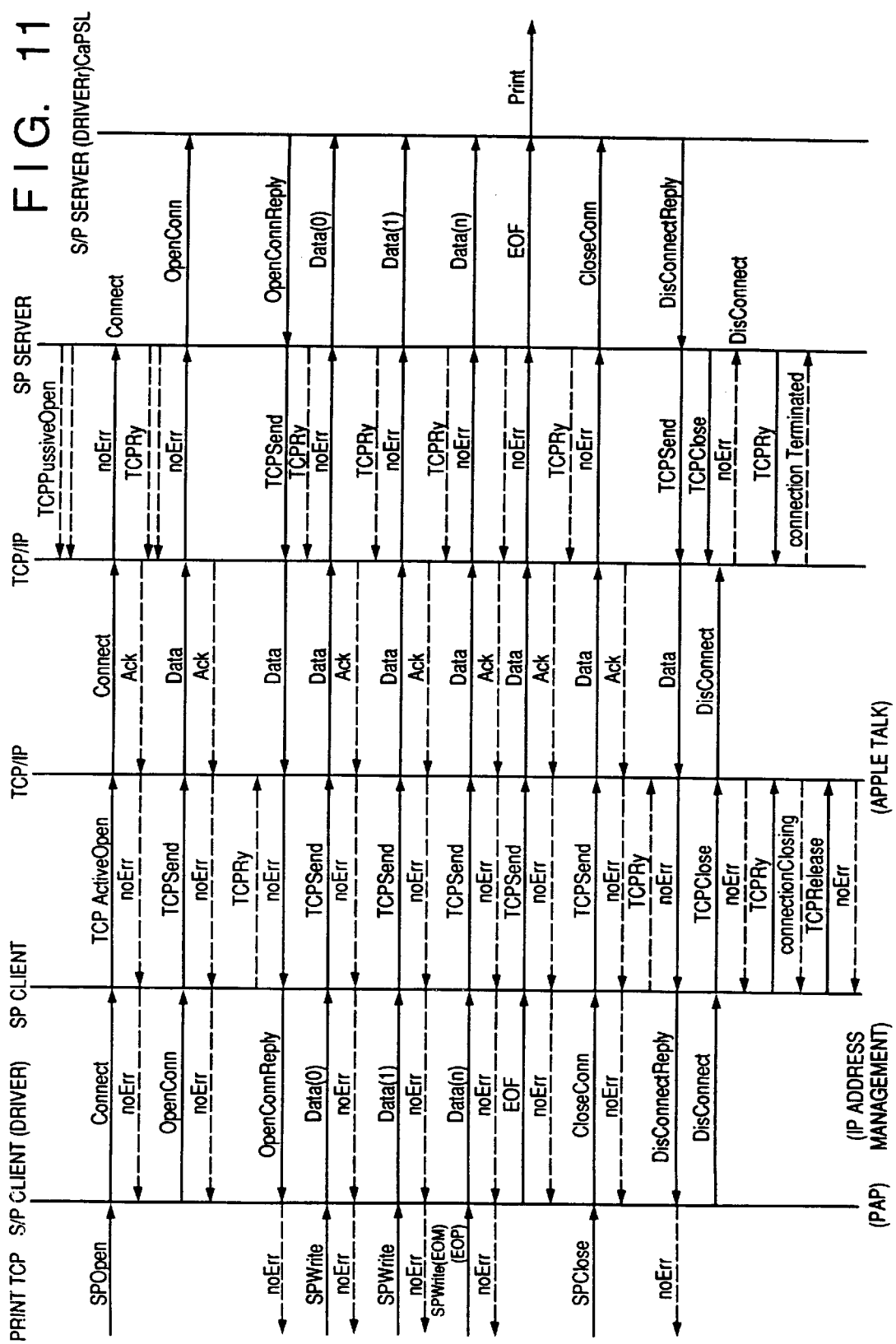
FIG. 11 illustrates as an example a signal sequence between the server and the client.
Figure 12:
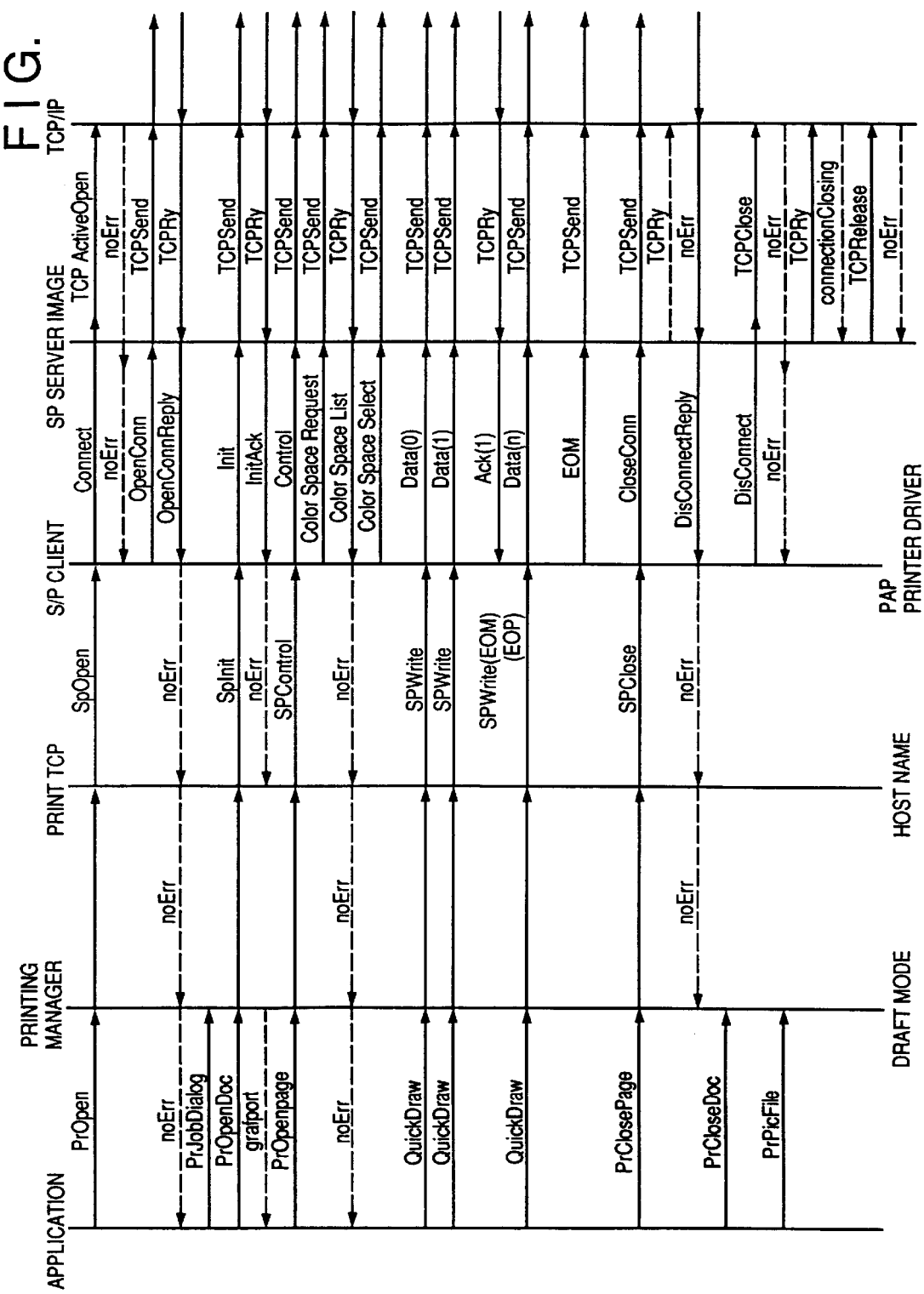
FIG. 12 illustrates in detail a signal sequence on a client side.

FIGS. 11 and 12 show the sequence of these packets and commands. FIG. 11 depends upon the flow between a client and a server. FIG. 12 depends upon the flow between the MacTCP and the SP Client.

Similarly to standard file access, access from the application side are made using Open, Read, Write and Close commands. First, the PrOpen function is called from the application. The SP Client receives the SPOpen command, and it issues the TCPActivateOpen function by the Connect command to be connected with the TCP/IP. The SP Client indicates that the call of the TCP/IP has been normally set if the return of the function is "noErr". The SP Client subsequently transmits the OpenConn packet to the SP Server to link the SP Client and the SP Server on the set TCP link. The SP Server returns the OpenCopnnReply to acknowledge the setting of the session link unless there is no problem in the printer. Thereafter, the SP Client transmits the Init packet and the Control packet to the server side to initialize the parameters of the server side. Then, the SP Client issues the Color-Space-Request packet for color space control. The subsequent communication has been already described. These SP Server/SP Client packets are transmitted by TCPSend or TCPRv packets of the TCP/IP protocol.

[Modification]

Figure 13:
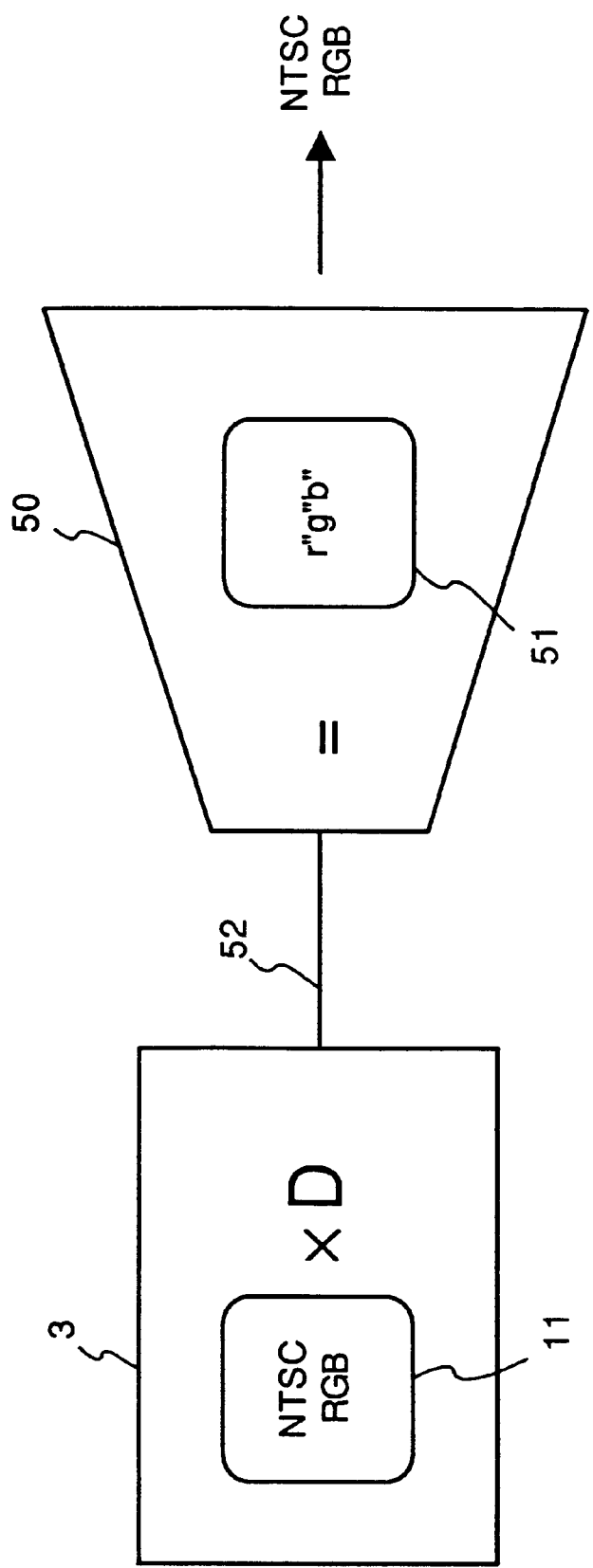
FIG. 13 illustrates as an example color correction in a monitor.
Figure 14:
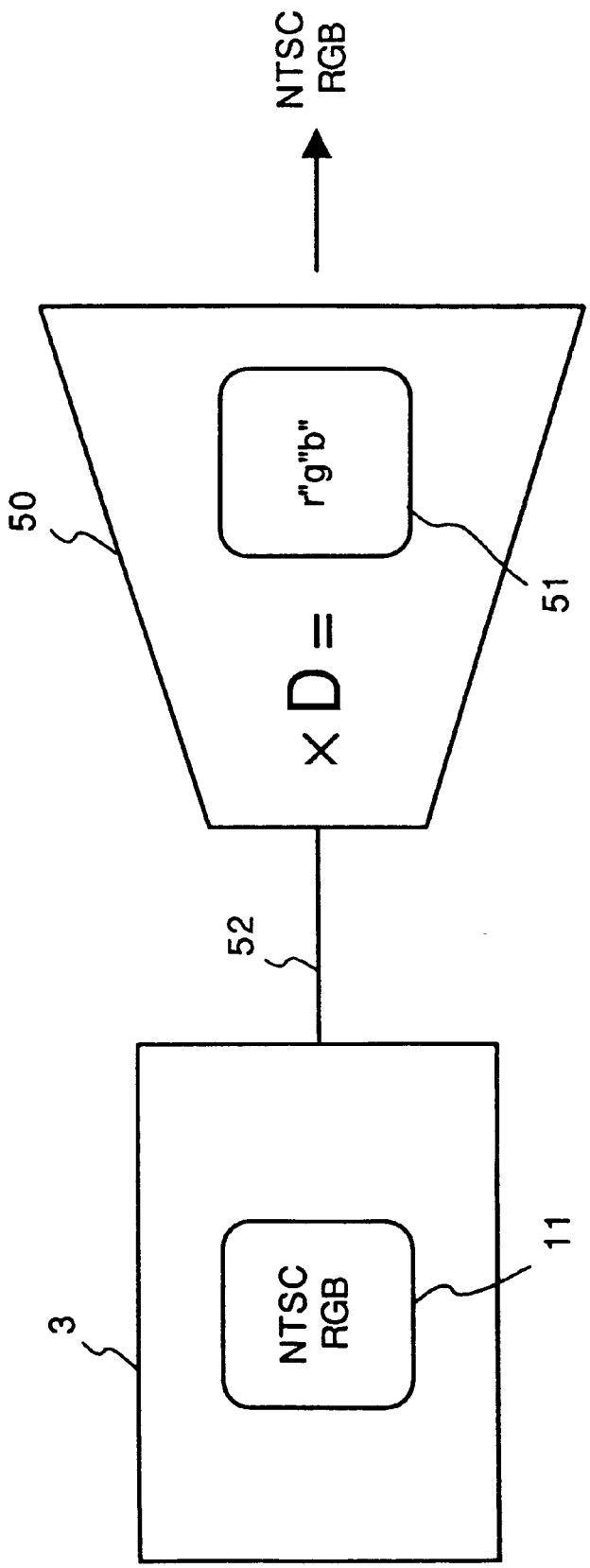
FIG. 14 illustrates as another example color correction in the monitor.

FIGS. 13 and 14 show a modification to the present embodiment. FIG. 13 shows image information displayed on a CRT monitor. In FIG. 13, reference numeral 50 denotes the CRT monitor; 51, a corrected color signal for displaying correct NTSC RGB color on the monitor; "D", a correction coefficient matrix; and 52, a connection cable. In order to display the RGB signal which is "proper" to human eyes, color correction such as gamma ($\gamma$) correction is required. In FIG. 13, gamma correction is performed on the computer side. As it takes a long period to perform such correction by a CPU, it is usually made on the monitor 50 side, as shown in FIG. 14. The scanner color signal is multiplied by the correction coefficient matrix D on the monitor side. Generally, a color correction circuitry of a monitor has a hardware construction, or it is a high-speed processor such as a DSP (Digital Signal Processor) for high-speed correction. In any case, to the computer side, the CRT has conventionally been a passive device which simply reproduces a given RGB signal. In other words, the coefficient matrix D has been the CRT monitor 50's own color processing system included in the monitor 50, and has never been directed to the computer for its dynamic use in frequent operation (except setting correction).

The device-independent color processing method according to the present invention can even omit the image processing operation by the CPU of the computer while the interface passes a color signal according to a virtual standard color space to the CRT monitor. Actually, the input-side color correction coefficients as the equation 4 and those of the scanner in FIG. 2 can be transmitted separately from the image signal, in the form of protocol, to the CRT monitor. Equation 8 shows this processing. "F" denotes a correction coefficient matrix for matching the scanner's own color space to the standard color space; "G", a correction coefficient matrix in the computer; and "D", a correction coefficient matrix for matching the monitor's own color space to the standard color space. If the CRT monitor is an active device as that in the present invention, the color correction operation can be made by the final device at a time as the equation 8.

In this manner, the present invention realizes a color processing system which optimizes hardware resource for high-speed operation while containing the device-independent concept, further, reduces accumulative errors of the operation.

It should be noted that the algorithm having cascade-connected filter operations so as to perform the operation at a time within the final device can be easily made when color correction is established between the three primary color representation (color mixing system) such as "RGB", "XYZ", "CMY" an "YIQ". However, in case of conversion between one of the above color systems and a color representation calculated from the XYZ system (color developing system) such as "L*a*b*", the operation based on the above algorithm cannot be performed easily. Rather, in such case, the color mixing system should be converted into the color developing system before operation.

[Color Correction]

When a computer-processed color image is printed, whether the printed result coincides with the color on a CRT monitor or not is a significant problem. In a computer-processing system, the monitor and the printer are adjusted in the following manner.

In standard monitor adjustment, based on the assumption that the respective RGB color-components vary from 0 to 100, a "RGB=100,0,0" signal is inputted to display red, and the displayed red color is measured by a spectrophotometer. The measurement result obtained as a "XYZ" signal is converted into a RGB signal. The "R" signal gain is adjusted to "100, 0, 0". Similarly, a "RGB=100, 100, 100" signal is inputted and adjusts so that the output of the spectrophotometer will become "100, 100, 100". Next, a half tone color signal such as "RGB=70, 30, 30" is inputted and adjustment is performed in a similar manner, and finally, a signal "RGB=70, 70, 70" is inputted as white balance to complete adjustment. Regarding printer adjustment, the basis of the adjustment method is correspondent to the above method. It goes without saying that there are other applicable adjustment methods.

Once the monitor and the printer are respectively adjusted, the corrected values become unchanged. Even through this adjustment stage, the CRT monitor display and the printed result may be different. Printing experts take this very seriously. To solve this problem, electronic color codes have been introduced. The electronic color codes are provided by printing ink makers, with computer color samples (color image data) so that colors the same as their ink-printing color samples can be obtained on computer display. When a color image data is formed on a computer and finally printed out, referring to the electronic color codes is inevitable for the accuracy of the work. The electronic color codes are provided in the form of application, or provided as the document file of a popular application soft to be compared with attached color samples. Accordingly, the application's hue adjustment function requires minute adjustment. However, a plurality of applications, a plurality of ink makers, a plurality of color samples, and combinations thereof, will make such adjustment confusing.

Setting of adjustment values can be made by a utility program or by a DTP application. However, the adjustment results should not be managed by the application but by a device driver so as to avoid color correction for every color sample at every application. According to the embodiment, a color image signal passed to a device driver can be a virtual standard color. For this reason, the application side does not need to perform color matching, and the device driver itself performs it. The device driver manages color matching informations by saving them as color files of ink makers. The files can be changed over so that reference to the color samples in the same environment can be made from any application. In case of Macintosh, the device driver has cdev resources. This mechanism enables color correction from the Control Panel while operating an application, further, once-set values become common values to all the applications.

When using the device-independent color processing method according to the present invention, an application and a device driver can communicate with each other. In this case, the setting values of the device driver can be directly controlled from the application. FIG. 15 shows the relation between the direct control from the application. In FIG. 15, reference numeral 3 denotes a computer; 60, a printer; 61, a device driver for controlling the printer 60, which always exists in the computer 3; 62, a correction data file for a specific set of electronic color codes; and 63, a correction data file for a second set of electronic color codes. The device driver 61 directly uses the respective correction files, however, the application can indirectly use them, as shown in FIG. 15. Further, the correction files can be controlled from the cdev.

As described above, the device-independent color processing method enables color processing based on the standard color space to image data received from an input device, since the data is conceptually transmitted in accordance with virtual standard color space. Further, in this method, image data can be transmitted to an output device without color processing operation. Accordingly, a color processing system which improves the operation speed without accumulative errors such as rounding error, and optimizes hardware resource with maintaining the device-independent concept can be realized.

As described above, according to the present invention, a plurality of devices having different color space can be utilized as one virtual device.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:

judging means for judging whether or not a receiving unit has a color space conversion function which performs color space conversion based on a set parameter by a predetermined protocol; and transmitting means for transmitting color image data depending on a first color space and the parameter for converting the first color space into a second color space to the receiving unit, if a judgment that the receiving unit has the color space conversion function is made by the judging means.

2. The apparatus according to claim 1, wherein said color image data depending on the first color space is color image data representing an object of an image scanned by a scanner.

3. The apparatus according to claim 1, wherein said first color space is peculiar to a device.

4. The apparatus according to claim 1, wherein said second color space is a standard color space.

5. The apparatus according to claim 1, wherein said receiving unit is connected with the image processing apparatus via a connection point physically.

6. The apparatus according to claim 1, wherein said receiving unit is connected with the image processing apparatus via a connection point logically.

7. The apparatus according to claim 1, further comprising:
color space conversion means for converting the first color space into the second color space,
wherein said color space conversion means performs a conversion process, if a judgment that the receiving unit does not have the color space conversion function is made by the judging means.

8. An image processing method comprising the steps of:
judging whether or not a receiving unit has a color space conversion function which performs color space conversion based on a set parameter by a predetermined protocol; and
transmitting color image data depending on a first color space and the parameter for converting the first color space into a second color space to the receiving unit, if a judgment that the receiving unit has the color space conversion function is made in the judging step.

9. The method according to claim 8, wherein said color image data depending on the first color space is color image data representing an object of an image scanned by a scanner.

10. The method according to claim 8, wherein said first color space is peculiar to a device.

11. The method according to claim 8, wherein said second color space is a standard color space.

12. The method according to claim 8, wherein said receiving unit is connected with an image processing apparatus via a connection point physically.

13. The method according to claim 8, wherein said receiving unit is connected with an image processing apparatus via a connection point logically.

14. The method according to claim 8, further comprising the step of:
converting the first color space into the second color space, if a judgment that the receiving unit does not have the color space conversion function is made in said judging step.

\* \* \* \* \*

UNITED STATES PATENT AND TRADEMARK OFFICE
CERTIFICATE OF CORRECTION

PATENT NO.   :   5,923,824
DATED        :   July 13, 1999
INVENTOR(S)  :   YOSHIKAZU YOKOMIZO It is certified that error appears in the above-identified patent and that said Letters Patent is hereby corrected as shown below:

COLUMN 1:

Line 7, "Present" should read --The present--.

COLUMN 3:

Line 56, "a" (second occurrence) should read --an--; and

Line 61, "correct" should read --correctly--.

COLUMN 4:

Line 3, "incredible" should read --unreliable--;
    Line 4, "computer" should read --computers--; and
    Line 20, "variety" should read --a variety--.

COLUMN 5:

Line 28, "INTSC" should read --NTSC--.

UNITED STATES PATENT AND TRADEMARK OFFICE
CERTIFICATE OF CORRECTION

PATENT NO. : 5,923,824

DATED : July 13, 1999

INVENTOR(S) : YOSHIKAZU YOKOMIZO

It is certified that error appears in the above-identified patent and that said Letters Patent is hereby corrected as shown below:

COLUMN 7:

Line 59, "can" should read --can be--.

COLUMN 8:

Line 44, "deice" should read --device--.

COLUMN 9:

Line 67, "indicates" should read --indicate--.

COLUMN 13:

Line 45, "soft" should read --software--.

Signed and Sealed this

Fourth Day of July, 2000

Attest:

Q. TODD DICKINSON

*Attesting Officer*  *Director of Patents and Trademarks*